United States Patent
Akazawa et al.

(10) Patent No.: US 9,208,905 B2
(45) Date of Patent: Dec. 8, 2015

(54) AUXILIARY FEEDWATER VALVE CONTROL APPARATUS OF STEAM GENERATOR

(71) Applicant: MITSUBISHI HEAVY INDUSTRIES, LTD., Tokyo (JP)

(72) Inventors: Kimio Akazawa, Tokyo (JP); Susumu Utsumi, Tokyo (JP); Kiyohiko Tsubouchi, Tokyo (JP); Satoshi Hanada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 593 days.

(21) Appl. No.: 13/660,369

(22) Filed: Oct. 25, 2012

(65) Prior Publication Data

US 2013/0108003 A1   May 2, 2013

(30) Foreign Application Priority Data

Oct. 26, 2011 (JP) ................. 2011-235475

(51) Int. Cl.
  G21C 15/18   (2006.01)
  G21C 7/32    (2006.01)
  F22B 35/00   (2006.01)
  F22B 37/46   (2006.01)

(52) U.S. Cl.
  CPC ............. *G21C 7/32* (2013.01); *F22B 35/004* (2013.01); *F22B 37/46* (2013.01); *G21C 15/182* (2013.01)

(58) Field of Classification Search
  USPC ....................................... 376/297
  See application file for complete search history.

(56) References Cited

U.S. PATENT DOCUMENTS

| 4,123,909 A | * | 11/1978 | French ........................... 60/646 |
| 4,505,873 A | * | 3/1985  | Petetrot et al. ................ 376/216 |
| 4,563,746 A | * | 1/1986  | Yoshida et al. ............... 702/185 |
| 4,738,818 A |   | 4/1988  | Cantineau |

(Continued)

FOREIGN PATENT DOCUMENTS

| JP | 48-14083   | 4/1973 |
| JP | 55-28493   | 2/1980 |

(Continued)

OTHER PUBLICATIONS

Office Action dated Aug. 18, 2015, issued in counterpart Japanese application No. 2011-235475 (w/English translation) (7 pages).

*Primary Examiner* — Jack W Keith
*Assistant Examiner* — Sean P Burke
(74) *Attorney, Agent, or Firm* — Westerman, Hattori, Daniels & Adrian, LLP (57) ABSTRACT

An auxiliary feedwater valve control apparatus of a steam generator that operates an auxiliary feedwater valve in an auxiliary feed water system provided as a protective system of a main feed water system that feeds secondary cooling water to a steam generator, includes a water-level detection means that detects a water level of secondary cooling water in the steam generator, a water-level-deviation calculation means that calculates a deviation between a preset target water level and a water level detected by the water-level detection means, a valve-operation setting means that sets an aperture of the auxiliary feedwater valve corresponding to a deviation of the water level, and a valve drive means that outputs a signal for driving the auxiliary feedwater valve corresponding to setting by the valve-operation setting means.

5 Claims, 4 Drawing Sheets

(56) References Cited

U.S. PATENT DOCUMENTS

| | | | | |
|---|---|---|---|---|
| 4,753,770 A | * | 6/1988 | Bogdan et al. | 376/246 |
| 4,847,039 A | * | 7/1989 | Kendall et al. | 376/297 |
| 5,960,049 A | * | 9/1999 | Wilkosz et al. | 376/210 |
| 7,120,218 B2 | * | 10/2006 | Srinivasan | 376/211 |
| 2003/0072403 A1 | * | 4/2003 | Dagard | 376/299 |

FOREIGN PATENT DOCUMENTS

| | | |
|---|---|---|
| JP | 56-117196 | 9/1981 |
| JP | 56-149504 | 11/1981 |
| JP | 57-129301 | 8/1982 |
| JP | 59-24102 | 2/1984 |
| JP | 60-135899 | 7/1985 |
| JP | 62-293003 | 12/1987 |
| JP | 63-34405 | 2/1988 |
| JP | 63-096405 A | 4/1988 |
| JP | 1-167699 | 7/1989 |
| JP | 3-6498 | 1/1991 |
| JP | 3-12592 | 1/1991 |
| JP | 4-148101 | 5/1992 |
| JP | 4-104597 U | 9/1992 |
| JP | 5-142390 | 6/1993 |
| JP | 9-152903 | 6/1997 |
| JP | 10-122506 A | 5/1998 |
| JP | 11-325407 | 11/1999 |
| JP | 2003-139302 | 5/2003 |
| JP | 2007-170814 | 7/2007 |
| JP | 2010-159713 | 7/2010 |
| JP | 2011-95095 | 5/2011 |

* cited by examiner

AUXILIARY FEEDWATER VALVE CONTROL APPARATUS OF STEAM GENERATOR

FIELD

The present invention relates to an auxiliary feed water system provided as a protective system of a main feed water system that feeds secondary cooling water to a steam generator in a pressurized water reactor (PWR), and relates to an auxiliary feedwater valve control apparatus of a steam generator that controls a flow rate of feed water by operating an auxiliary feedwater valve in the auxiliary feed water system.

BACKGROUND

Conventionally, in a method of controlling a flow rate of feed water to a steam generator described in Patent document 1, a main feed water system controlled according to a program is provided to maintain a water level of secondary cooling water in the steam generator. The main feed water system is backed up by an auxiliary feed water system and is automatically switched to the auxiliary feed water system when the main feed water system cannot maintain a minimum water level.

CITATION LIST

Patent Literature

[Patent Document 1] Japanese Patent Application Laid-open No. S63-96405

SUMMARY

Technical Problem

However, as described in Japanese Patent Application Laid-open No. S63-96405, the auxiliary feed water system is a protective system including only a minimum control device, and does not automatically adjust a flow rate of feed water to the steam generator to maintain the water level according to a programmed procedure. The protective system including only a minimum control device means that, in control of an auxiliary feedwater valve, only an opening/closing signal is output, and only when an opening signal is ON, control is performed in an opening direction at a predetermined speed, and only when a closing signal is ON, control is performed in a closing direction at a predetermined speed. Therefore, it does not execute any feedback control on an aperture of the auxiliary feedwater valve corresponding to the water level.

Therefore, the auxiliary feedwater valve is operated by a manual operation of an operator to control so that the water level of the steam generator falls within a certain variation range. The water level control of the steam generator by the auxiliary feedwater valve is performed in a plant output state when a plant is shut down at the time of an accident. Therefore, operations of other devices and monitoring of measuring gauges need to be performed frequently at the same time, and thus there is a large burden on the operator. Accordingly, there has been a demand for automatic water level control of a steam generator by an auxiliary feedwater valve.

The present invention has been achieved in order to solve the above problems, and an object of the present invention is to provide an auxiliary feedwater valve control apparatus of a steam generator that can automatically control a water level by an auxiliary feedwater valve in an auxiliary feed water system.

Solution to Problem

According to an aspect of the present invention, an auxiliary feedwater valve control apparatus of a steam generator that operates an auxiliary feedwater valve in an auxiliary feed water system provided as a protective system of a main feed water system that feeds secondary cooling water to a steam generator, includes: a water-level detection unit that detects a water level of secondary cooling water in the steam generator; a water-level-deviation calculation unit that calculates a deviation between a preset target water level and a water level detected by the water-level detection unit; a valve-operation setting unit that sets an aperture of the auxiliary feedwater valve corresponding to a deviation of the water level; and a valve drive unit that outputs a signal for driving the auxiliary feedwater valve corresponding to setting by the valve-operation setting unit.

According to the auxiliary feedwater valve control apparatus of a steam generator, the auxiliary feedwater valve can be operated to perform water level control of secondary cooling water in the steam generator automatically without depending on operations by an operator.

Advantageously, in the auxiliary feedwater valve control apparatus of a steam generator, the valve-operation setting unit sets a driving time of the auxiliary feedwater valve corresponding to a set aperture of the auxiliary feedwater valve, based on an opening/closing operation speed of the auxiliary feedwater valve measured in advance.

According to the auxiliary feedwater valve control apparatus of a steam generator, the driving time of the auxiliary feedwater valve for realizing the set aperture of the auxiliary feedwater valve is set based on the opening/closing operation speed of the auxiliary feedwater valve. Accordingly, the aperture of the auxiliary feedwater valve can be controlled corresponding to the performance of the auxiliary feedwater valve.

Advantageously, in the auxiliary feedwater valve control apparatus of a steam generator, number of opening/closing operations per unit time of the auxiliary feedwater valve is defined, and the valve-operation setting unit sets a driving time of the auxiliary feedwater valve corresponding to a set aperture of the auxiliary feedwater valve, based on an opening/closing operation speed of the auxiliary feedwater valve measured in advance, and sets a driving cycle of the auxiliary feedwater valve corresponding to the set driving time of the auxiliary feedwater valve and the number of opening/closing operations per unit time of the auxiliary feedwater valve.

According to the auxiliary feedwater valve control apparatus of a steam generator, for example, when the set driving time of the auxiliary feedwater valve is relatively short (when a deviation between the target water level and the detected water level is relatively small), the driving cycle of the auxiliary feedwater valve is set long (the number of times of driving is reduced). With this configuration, the water level can be controlled to reach the target water level more quickly. On the other hand, when the set driving time of the auxiliary feedwater valve is relatively long (when the deviation between the target water level and the detected water level is relatively large), the driving cycle of the auxiliary feedwater valve is set short (the number of times of driving is increased). With this configuration, the water level can be controlled to reach the target water level, while stabilizing the water level by finely adjusting the aperture. By setting the driving cycle of the auxiliary feedwater valve corresponding to the set driving time of the auxiliary feedwater valve and the number of opening/closing operations per unit time of the auxiliary feedwater valve in this manner, appropriate water level control can be performed until the water level reaches the target water level.

Advantageously, in the auxiliary feedwater valve control apparatus of a steam generator, number of opening/closing operations per unit time and a total operating time in a unit time of the auxiliary feedwater valve are defined, and the valve-operation setting unit sets a driving time of the auxiliary feedwater valve corresponding to a set aperture of the auxiliary feedwater valve, based on an opening/closing operation speed of the auxiliary feedwater valve measured in advance, and sets a driving cycle of the auxiliary feedwater valve corresponding to the set driving time of the auxiliary feedwater valve and the number of opening/closing operations per unit time of the auxiliary feedwater valve, and sets a longest driving time per driving cycle corresponding to the set driving cycle of the auxiliary feedwater valve and the total operating time in the unit time of the auxiliary feedwater valve.

According to the auxiliary feedwater valve control apparatus of a steam generator, for example, when the set driving time of the auxiliary feedwater valve is relatively short (when a deviation between the target water level and the detected water level is relatively small), the driving cycle of the auxiliary feedwater valve is set long (the number of times of driving is reduced) and the longest driving time per driving cycle is set relatively long. With this configuration, the water level can be controlled to reach the target water level more quickly. On the other hand, when the set driving time of the auxiliary feedwater valve is relatively long (when the deviation between the target water level and the detected water level is relatively large), the driving cycle of the auxiliary feedwater valve is set short (the number of times of driving is increased) and the longest driving time per driving cycle is set relatively short. With this configuration, the water level can be controlled to reach the target water level, while stabilizing the water level by finely adjusting the aperture. By setting the driving cycle of the auxiliary feedwater valve corresponding to the set driving time of the auxiliary feedwater valve and the number of opening/closing operations per unit time of the auxiliary feedwater valve in this manner, and by setting the longest driving time per driving cycle corresponding to the total operating time in the unit time of the auxiliary feedwater valve, appropriate water level control can be performed until the water level reaches the target water level.

Advantageously, in the auxiliary feedwater valve control apparatus of a steam generator, the valve-operation setting unit acquires water-level time-response information corresponding to an aperture of the auxiliary feedwater valve in advance, determines a parameter in a non-minimum phase transfer function, which approximates a response to the water level by an inverse response from a set aperture of the auxiliary feedwater valve, based on the water-level time-response information, and sets the aperture of the auxiliary feedwater valve, taking into consideration a gain margin and a phase margin of frequency characteristics of the non-minimum phase transfer function in which the parameter has been determined.

According to the auxiliary feedwater valve control apparatus of a steam generator, water level variation at the time of an inverse response can be suppressed by setting the aperture of the auxiliary feedwater valve according to the inverse response.

Advantageously, in the auxiliary feedwater valve control apparatus of a steam generator, the valve-operation setting unit obtains an aperture of the auxiliary feedwater valve, respectively, under different temperature conditions of secondary cooling water in the steam generator included in the water-level time-response information, and selects a minimum value thereof.

When a temperature of secondary cooling water in the steam generator is high, a temperature difference from auxiliary cooling water is large and a maximum inverse response amount increases, and if a feed amount of auxiliary cooling water is large, the maximum inverse response amount further increases. Therefore, according to the auxiliary feedwater valve control apparatus of a steam generator, by setting the aperture of the auxiliary feedwater valve according to an inverse response accompanied by a temperature condition to the minimum amount, water level variation at the time of the inverse response can be suppressed even if there is a large temperature difference.

Advantageous Effects of Invention

According to the present invention, it is possible to automatically control a water level by an auxiliary feedwater valve in an auxiliary feed water system.

DESCRIPTION OF EMBODIMENTS

Exemplary embodiments of the present invention will be explained below in detail with reference to the accompanying drawings. The present invention is not limited to the embodiments. In addition, constituent elements in the following embodiment include those that can be replaced by and easily occur to persons skilled in the art, or that are substantially equivalent.

Figure 1:
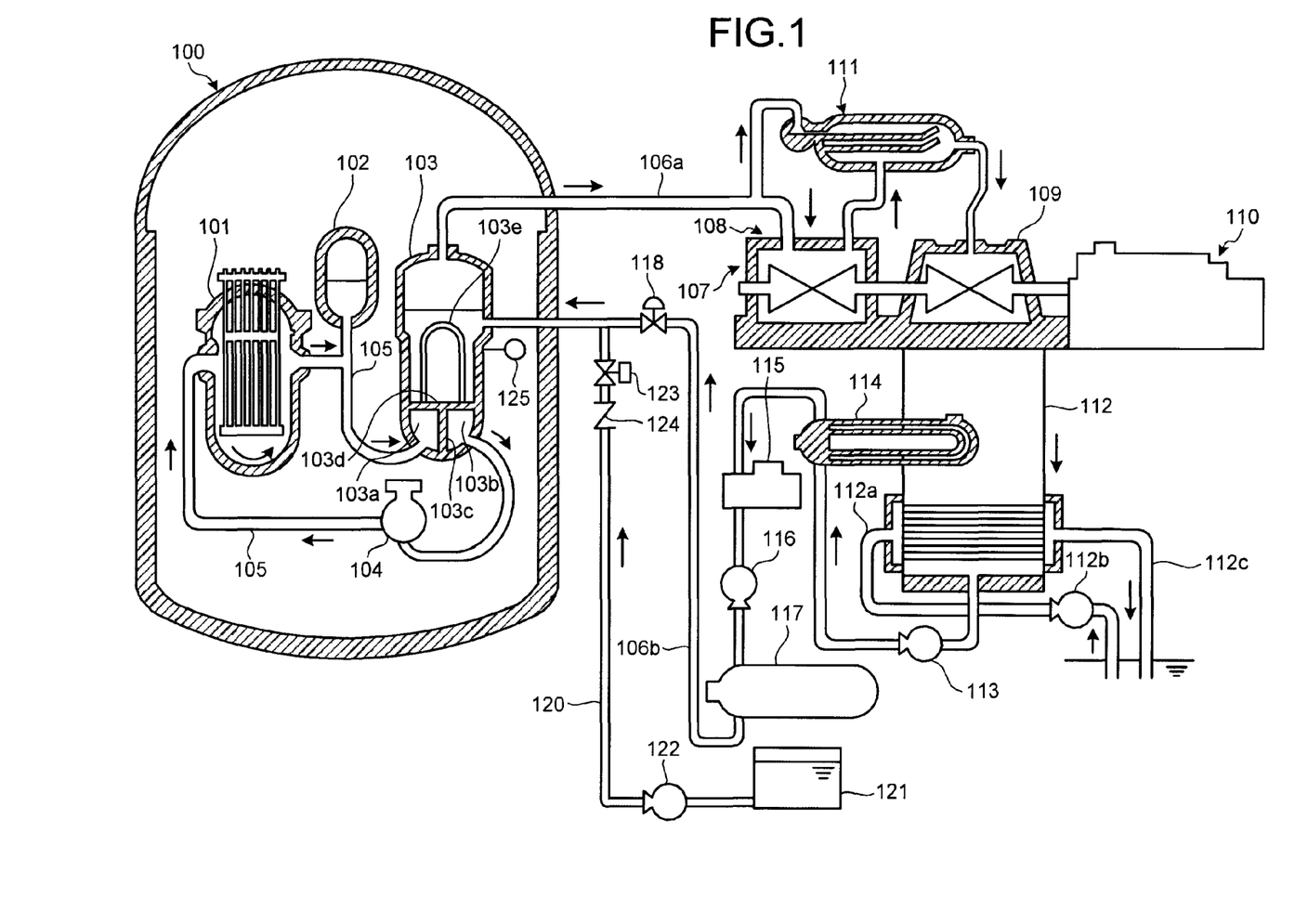
FIG. 1 is a schematic configuration diagram of an example of a nuclear power plant.

FIG. 1 is a schematic configuration diagram of a nuclear power plant. As shown in FIG. 1, in a containment 100 of a nuclear power plant, a pressurized water reactor (PWR) 101, a pressurizer 102, a steam generator 103, and a primary cooling water pump 104 are sequentially connected by a primary cooling water pipe 105, thereby constituting a circulation path of primary cooling water.

In the steam generator 103, an inlet-side water chamber 103a and an outlet-side water chamber 103b are provided and divided by a partition plate 103c in a lower part thereof formed in a hemispherical shape. The inlet-side water chamber 103a and the outlet-side water chamber 103b are divided from an upper side of the steam generator 103 by a tube plate 103d provided on the ceiling of the inlet-side water chamber 103a and the outlet-side water chamber 103b. Heat transfer tubes 103e having an inverted U-shape are provided on the upper part of the steam generator 103. Ends of the heat transfer tubes 103e are supported by the tube plate 103d to connect the inlet-side water chamber 103a and the outlet-side water chamber 103b. The primary cooling water pipe 105 on an inlet side is connected to the inlet-side water chamber 103a, and the primary cooling water pipe 105 on an outlet side is connected to the outlet-side water chamber 103b. A secondary cooling water pipe 106a on an outlet side is connected to an upper end on the upper side of the steam generator 103 divided by the tube plate 103d, and a secondary cooling water pipe 106b on an inlet side is connected to the side of the steam generator 103 on the upper side.

In the nuclear power plant, the steam generator 103 is connected to a steam turbine 107 outside of the containment 100 via the secondary cooling water pipes 106a and 106b, thereby constituting a circulation path of secondary cooling water.

The steam turbine 107 includes a high pressure turbine 108 and a low pressure turbine 109, and a power generator 110 is connected thereto. A moisture separation heater 111 is branched from the secondary cooling water pipe 106a and connected to the high pressure turbine 108 and the low pressure turbine 109. The low pressure turbine 109 is connected to a condenser 112. The condenser 112 is connected to the secondary cooling water pipe 106b. The secondary cooling water pipe 106b is connected to the steam generator 103 as described above, extending from the condenser 112 to the steam generator 103, and is provided with a condensate pump 113, a low-pressure feed water heater 114, a deaerator 115, a main feed water pump 116, a high-pressure feed water heater 117, and a main feed check valve 118.

Accordingly, in the nuclear power plant, primary cooling water is heated by the pressurized water reactor 101 to become high-temperature and high-pressure primary cooling water, and is pressurized by the pressurizer 102 and fed to the steam generator 103 via the primary cooling water pipe 105, with a constant pressure being maintained. In the steam generator 103, heat exchange is performed between primary cooling water and secondary cooling water, so that secondary cooling water is evaporated to generate steam. Cooled primary cooling water after heat exchange is recovered on the primary cooling water pump 104 side via the primary cooling water pipe 105, and returned to the pressurized water reactor 101. Meanwhile, secondary cooling water that becomes steam by heat exchange is fed to the steam turbine 107. The moisture separation heater 111 of the steam turbine 107 feeds overheated flue gas to the low pressure turbine 109, after removing moisture from the flue gas from the high pressure turbine 108 and heating the flue gas so as to become an overheated state. The steam turbine 107 is driven by the steam of secondary cooling water, and the power thereof is transmitted to the power generator 110 to generate electricity. The steam used for driving the turbine is discharged to the condenser 112. The condenser 112 performs heat exchange between cooling water (for example, sea water) taken by a pump 112b via an intake pipe 112a and steam discharged from the low pressure turbine 109, and the steam is condensed and returned to low-pressure saturated liquid. Cooling water used for heat exchange is discharged from a discharge pipe 112c. Condensed saturated liquid becomes secondary cooling water, and is pumped to outside of the condenser 112 by the condensate pump 113 via the secondary cooling water pipe 106b. Secondary cooling water passing through the secondary cooling water pipe 106b is heated by, for example, low-pressure steam extracted from the low pressure turbine 109 in the low-pressure feed water heater 114, and impurities such as dissolved oxygen and non-condensable gas (ammonia gas) are removed therefrom by the deaerator 115. Thereafter, secondary cooling water is fed by the main feed water pump 116, heated by high-pressure steam extracted from the high pressure turbine 108 in the high-pressure feed water heater 117, for example, and returned to the steam generator 103. A system that feeds secondary cooling water to the steam generator 103 is referred to as "main feed water system". In the main feed water system, the main feed water pump 116, the main feed check valve 118, and the like are controlled to maintain the water level of secondary cooling water in the steam generator 103.

In this kind of nuclear power plant, an auxiliary feed water system is provided for maintaining the water level when the water level of secondary cooling water in the steam generator 103 cannot be maintained in the main feed water system. The auxiliary feed water system includes an auxiliary feed water pipe 120 connected to a subsequent stage of the main feed check valve 118 in the secondary cooling water pipe 106b, an auxiliary feed water pump 122 that feeds auxiliary cooling water (for example, saturated liquid condensed by the condenser 112) stored in an auxiliary feed water pit 121 to the auxiliary feed water pipe 120, and an auxiliary feedwater valve 123 that adjusts a flow rate of auxiliary cooling water passing through the auxiliary feed water pipe 120 and reaching the steam generator 103. The auxiliary feed water system is set on a safe side such that the auxiliary feedwater valve 123 can be opened during a normal operation of the plant to feed auxiliary cooling water to the steam generator 103 by driving the auxiliary feed water pump 122, and a check valve 124 is provided on a front stage of the auxiliary feedwater valve 123 in the auxiliary feed water pipe 120 for preventing secondary cooling water from flowing into the auxiliary feed water pipe 120 from the secondary cooling water pipe 106b during a normal operation of the plant. That is, in the auxiliary feed water system, when the water level of secondary cooling water in the steam generator 103 cannot be maintained in the main feed water system, the auxiliary feed water pump 122 is driven to feed auxiliary cooling water to the steam generator 103.

Figure 2:
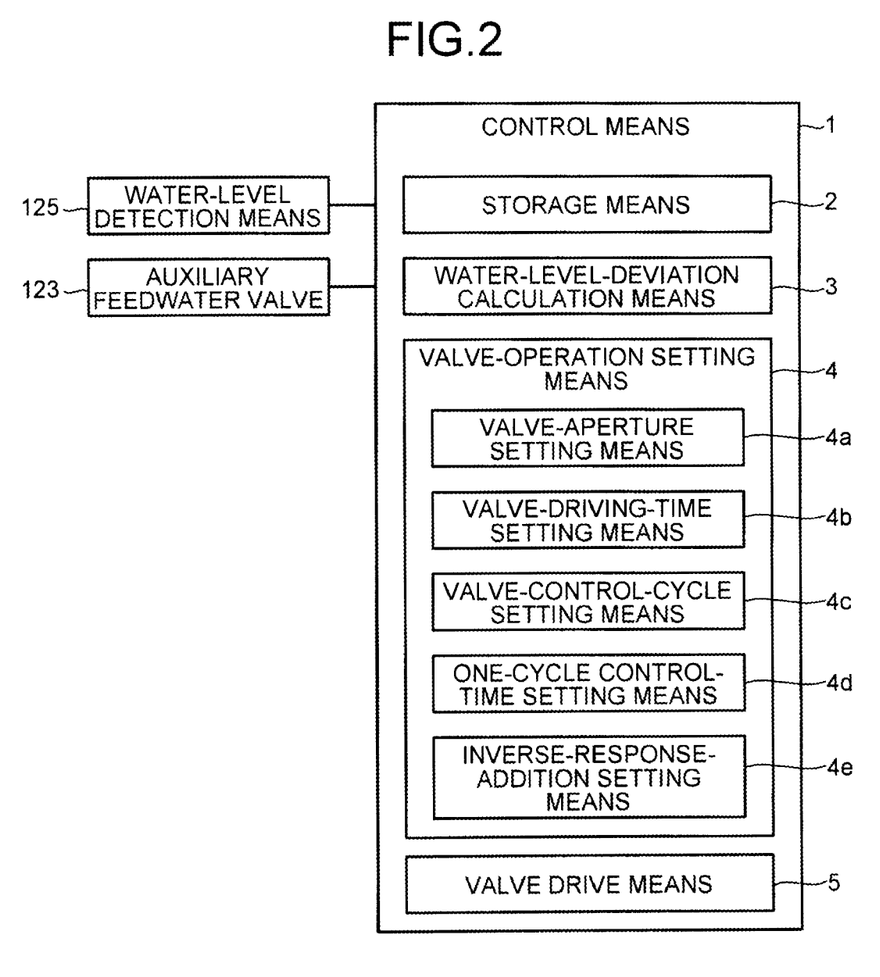
FIG. 2 is a block diagram of an auxiliary feedwater valve control apparatus according to an embodiment of the present invention.

In the present embodiment, an auxiliary feedwater valve control apparatus that controls the auxiliary feedwater valve 123 in the auxiliary feed water system is provided. FIG. 2 is a block diagram of the auxiliary feedwater valve control apparatus according to the present embodiment. The auxiliary feedwater valve control apparatus includes a water-level detection means 125 that detects a water level of secondary cooling water in the steam generator 103. The auxiliary feedwater valve control apparatus also includes a control means 1 that controls the auxiliary feedwater valve 123 based on the water level detected by the water-level detection means 125.

The control means 1 is constituted by a microcomputer or the like, and includes a storage means 2, a water-level-deviation calculation means 3, a valve-operation setting means 4, and a valve drive means 5.

The storage means 2 is constituted by a random access memory (RAM) or a read only memory (ROM), and programs and data are stored therein. The storage means 2 stores therein information of a preset target value (a target water level) of a water level to be maintained (target water level information). The storage means 2 also stores therein information specific to the auxiliary feedwater valve 123 (valve specific information). The valve specific information includes an opening/closing operation speed of the auxiliary feedwater valve 123, the number of opening/closing operations per unit time of the auxiliary feedwater valve 123, and a total operating time in the unit time of the auxiliary feedwater valve 123. The opening/closing operation speed of the auxiliary feedwater valve 123 is measured in advance in the auxiliary feedwater valve 123 to be used, and the number of opening/closing operations per unit time of the auxiliary feedwater valve 123 and the total operating time in the unit time of the auxiliary feedwater valve 123 are mechanical restrictions according to a structure of the auxiliary feedwater valve 123 to be used. The storage means 2 also stores therein information of a time response of a water level corresponding to the aperture of the auxiliary feedwater valve 123 (water-level time-response information). The water-level time-response information is acquired by a simulation in which the nuclear power plant described above is simulated (for example, see Japanese Patent Application Laid-open No. H6-231109 and Japanese Patent Application Laid-open No. H8-6483). The storage means 2 stores therein a non-minimum phase transfer function (see the following expression 1). In the expression 1, s denotes a Laplace operator, and a, b, and k are parameters for determining a time response of a water level.

$$k \cdot \frac{(b-s)}{s \cdot (s+a)} \tag{1}$$

The water-level-deviation calculation means 3 calculates a deviation between a target water level stored in the storage means 2 and a water level detected by the water-level detection means 125.

The valve-operation setting means 4 includes a valve-aperture setting means 4a, a valve-driving-time setting means 4b, a valve-control-cycle setting means 4c, a one-cycle control-time setting means 4d, and an inverse-response-addition setting means 4e.

The valve-aperture setting means 4a sets an aperture of the auxiliary feedwater valve 123 corresponding to a deviation of a water level calculated by the water-level-deviation calculation means 3. The aperture of the auxiliary feedwater valve 123 corresponds to a feed amount (a flow rate) of auxiliary cooling water passing through the auxiliary feedwater valve 123, while setting that a feeding amount of auxiliary cooling water fed by the auxiliary feed water pump 122 is constant.

The valve-driving-time setting means 4b sets a driving time of the auxiliary feedwater valve 123 corresponding to the aperture of the auxiliary feedwater valve 123 set by the valve-aperture setting means 4a based on the opening/closing operation speed of the auxiliary feedwater valve 123 stored in the storage means 2. That is, the driving time of the auxiliary feedwater valve 123 is a time during which the auxiliary feedwater valve 123 is driven until the auxiliary feedwater valve 123 has the set aperture. Specifically, when a deviation between the target water level and the detected water level is large, the driving time of the auxiliary feedwater valve 123 becomes long, and when the deviation between the target water level and the detected water level is small, the driving time of the auxiliary feedwater valve 123 becomes short.

When the number of opening/closing operations per unit time of the auxiliary feedwater valve 123 is defined, the valve-control-cycle setting means 4c sets a driving cycle of the auxiliary feedwater valve 123 corresponding to the driving time of the auxiliary feedwater valve 123 set by the valve-driving-time setting means 4b and the number of opening/closing operations per unit time of the auxiliary feedwater valve 123 stored in the storage means 2. In this manner, the valve-control-cycle setting means 4c sets the driving cycle, that is, the number of times of driving of the auxiliary feedwater valve 123 until the water level reaches the target water level, under a restriction of the number of operations of the auxiliary feedwater valve 123.

When the number of opening/closing operations per unit time of the auxiliary feedwater valve 123 and the total operating time in the unit time of the auxiliary feedwater valve 123 are defined, the one-cycle control-time setting means 4d sets the driving cycle of the auxiliary feedwater valve 123 corresponding to the driving time of the auxiliary feedwater valve 123 set by the valve-driving-time setting means 4b and the number of opening/closing operations per unit time of the auxiliary feedwater valve 123 stored in the storage means 2, and sets the longest driving time per driving cycle corresponding to the set driving cycle of the auxiliary feedwater valve 123 and the total operating time in the unit time of the auxiliary feedwater valve 123 stored in the storage means 2. In this manner, the one-cycle control-time setting means 4d sets the driving cycle, that is, the number of times of driving of the auxiliary feedwater valve 123 until the water level reaches the target water level, under a restriction of the number of operations of the auxiliary feedwater valve 123, and sets the longest driving time per driving cycle, that is, the longest time during which the auxiliary feedwater valve 123 can be driven in one driving cycle, under a restriction of the total operating time in the unit time of the auxiliary feedwater valve 123.

Figure 3:
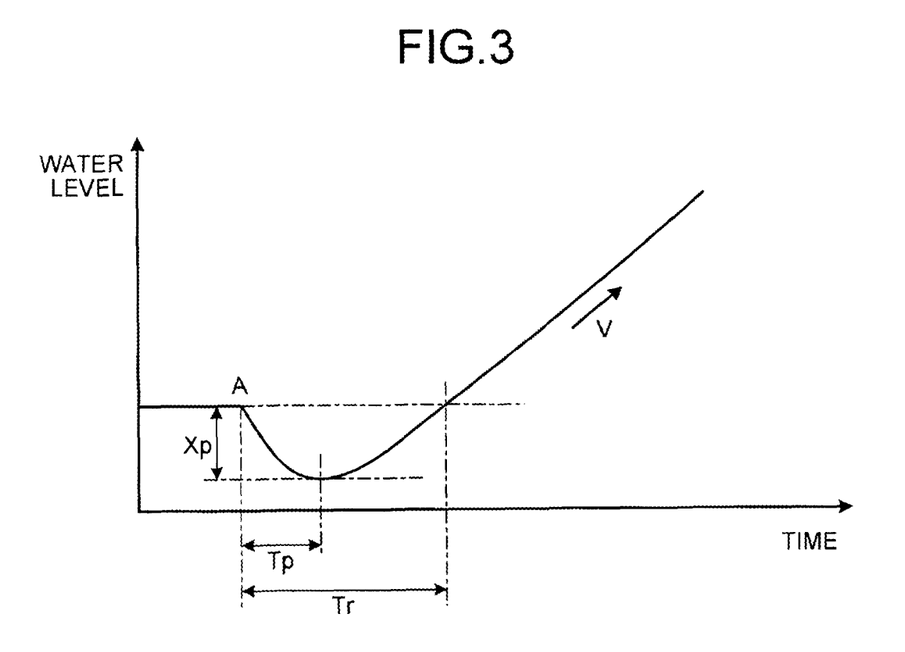
FIG. 3 is a conceptual diagram of an inverse response.

The inverse-response-addition setting means 4e adds an inverse response to the setting performed by the valve-aperture setting means 4a. FIG. 3 is a conceptual diagram of an inverse response. There is a temperature difference between secondary cooling water in the steam generator 103 and auxiliary cooling water fed from the auxiliary feedwater valve 123, and secondary cooling water in the steam generator 103 has a comparatively high temperature. Therefore, as shown in FIG. 3, when it is started to feed auxiliary cooling water to the steam generator 103 (a point A in FIG. 3), secondary cooling water in the steam generator 103 is condensed due to the temperature difference, and such an inverse response occurs that the water level decreases once. In FIG. 3, Xp denotes a maximum inverse response amount, Tp denotes a maximum inverse response time, Tr denotes an inverse response time, and V denotes a steady-water-level change speed.

The inverse-response-addition setting means 4e acquires the water-level time-response information and the non-minimum phase transfer function stored in the storage means 2, determines a parameter in the non-minimum phase transfer function, which approximates a response to the water level from the aperture of the auxiliary feedwater valve 123 set by the valve-aperture setting means 4a by the inverse response, based on the water-level time-response information, and sets the aperture of the auxiliary feedwater valve 123, taking into consideration a gain margin and a phase margin of frequency characteristics of the non-minimum phase transfer function in which the parameter has been determined.

Approximation of a response to the water level from the aperture of the auxiliary feedwater valve 123 is performed based on the following expression 2, while designating that Laplace-transformed temporal variation of the auxiliary feedwater valve 123 is H(s), and Laplace-transformed temporal variation of the water level of the steam generator 103 is L(s).

$$L(s) = k \cdot \frac{(b-s)}{s \cdot (s+a)} \cdot H(s) \tag{2}$$

In the inverse response, Xp, Tp, and Tr increase with an increase in temperature, corresponding to the temperature of secondary cooling water in the steam generator 103.

The inverse-response-addition setting means 4e respectively obtains the aperture of the auxiliary feedwater valve 123 corresponding to the deviation of the water level under different temperature conditions of secondary cooling water in the steam generator 103 included in the water-level time-response information, and a minimum value thereof is selected.

The valve drive means 5 outputs a signal for driving the auxiliary feedwater valve 123 corresponding to the setting by the valve-operation setting means 4.

Figure 4:
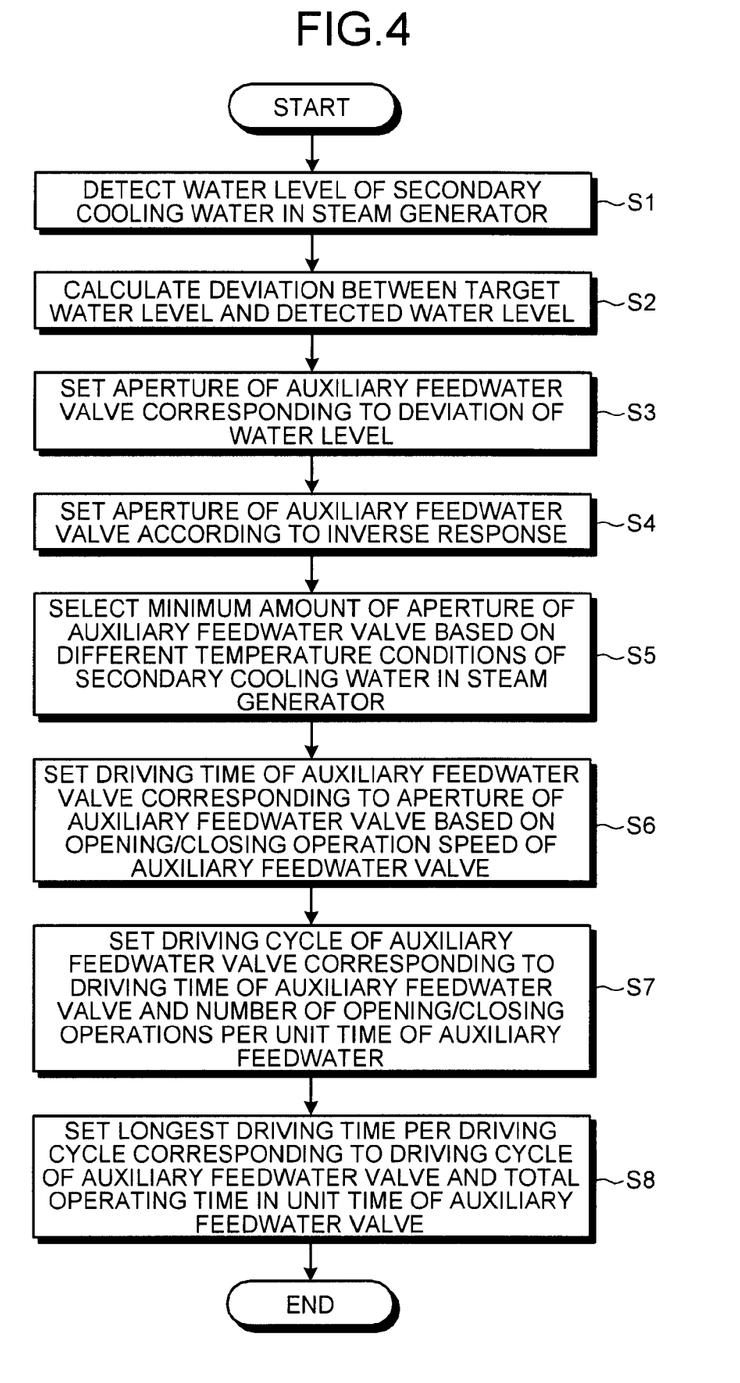
FIG. 4 is a flowchart of an operation of the auxiliary feedwater valve control apparatus.

An operation of the auxiliary feedwater valve 123 performed by the control means 1 is explained below. FIG. 4 is a flowchart of an operation of the auxiliary feedwater valve control apparatus.

When the water level of secondary cooling water in the steam generator 103 cannot be maintained in the main feed water system, switching to the auxiliary feed water system is automatically performed. In this case, the water-level detection means 125 first detects a water level of secondary cooling water in the steam generator 103 (Step S1). The water-level-deviation calculation means 3 then calculates a deviation between the target water level and the detected water level (Step S2). The valve-operation setting means 4 then sets the aperture of the auxiliary feedwater valve 123 corresponding to the deviation of the water level (Step S3).

To take an addition of an inverse response into consideration, subsequent to Step S3, the inverse-response-addition setting means 4e sets the aperture of the auxiliary feedwater valve 123 according to the inverse response (Step S4).

To take into consideration an influence of the inverse response due to the temperature of secondary cooling water in the steam generator 103, subsequent to Step S4, the inverse-response-addition setting means 4e selects the minimum amount of the aperture of the auxiliary feedwater valve 123 based on the different temperature conditions of secondary cooling water in the steam generator 103 (Step S5).

The valve-driving-time setting means 4b then sets the driving time of the auxiliary feedwater valve 123 corresponding to the aperture of the auxiliary feedwater valve 123, based on the opening/closing operation speed of the auxiliary feedwater valve 123 (Step S6).

When the number of opening/closing operations per unit time of the auxiliary feedwater valve 123 is defined, subsequent to Step S6, the valve-control-cycle setting means 4c sets the driving cycle of the auxiliary feedwater valve 123 corresponding to the driving time of the auxiliary feedwater valve 123 and the number of opening/closing operations per unit time of the auxiliary feedwater valve 123 (Step S7). For example, when the driving time of the auxiliary feedwater valve 123 set by the valve-driving-time setting means 4b is relatively short (when the deviation between the target water level and the detected water level is relatively small), the water level reaches the target water level more quickly by extending the driving cycle (reducing the number of times of driving) of the auxiliary feedwater valve 123. On the other hand, when the driving time of the auxiliary feedwater valve 123 set by the valve-driving-time setting means 4b is relatively long (when the deviation between the target water level and the detected water level is relatively large), the water level reaches the target water level, while the water level is stabilized by finely adjusting the aperture, by shortening the driving cycle (increasing the number of times of driving) of the auxiliary feedwater valve 123.

Furthermore, when the total operating time in the unit time of the auxiliary feedwater valve 123 is defined, subsequent to Step S7, the one-cycle control-time setting means 4d sets the longest driving time per driving cycle corresponding to the driving cycle of the auxiliary feedwater valve 123 and the total operating time in the unit time of the auxiliary feedwater valve 123 (Step S8). For example, when the driving time of the auxiliary feedwater valve 123 set by the valve-driving-time setting means 4b is relatively short (when the deviation between the target water level and the detected water level is relatively small), the water level reaches the target water level more quickly by extending the driving cycle (reducing the number of times of driving) of the auxiliary feedwater valve 123 and setting the longest driving time per driving cycle relatively long. On the other hand, for example, when the driving time of the auxiliary feedwater valve 123 set by the valve-driving-time setting means 4b is relatively long (when the deviation between the target water level and the detected water level is relatively large), the water level reaches the target water level, while the water level is stabilized by finely adjusting the aperture, by shortening the driving cycle (increasing the number of times of driving) of the auxiliary feedwater valve 123 and setting the longest driving time per driving cycle relatively short.

Subsequent to Step S8, the valve drive means 5 outputs a signal for driving the auxiliary feedwater valve 123, to finish the control.

If addition of the inverse response is not taken into consideration, subsequent to Step S3, the process proceeds to Step S6. If there is no influence of the temperature of secondary cooling water in the steam generator 103 in the inverse response, subsequent to Step S4, the process proceeds to Step S6. Furthermore, if the number of opening/closing operations per unit time of the auxiliary feedwater valve 123 and the total operating time in the unit time of the auxiliary feedwater valve 123 are not defined, the valve drive means 5 outputs a signal for driving the auxiliary feedwater valve 123 subsequent to Step S6, to finish the control. Further, if the total operating time in the unit time of the auxiliary feedwater valve 123 is not defined, subsequent to Step S7, the valve drive means 5 outputs a signal for driving the auxiliary feedwater valve 123, to finish the control.

In this control, by performing feedback control after the valve drive means 5 outputs a signal for driving the auxiliary feedwater valve 123, water level control can be performed without causing any unsteadiness in the water level of the steam generator 103, and therefore it is preferable.

As described above, the auxiliary feedwater valve control apparatus of a steam generator according to the present embodiment includes the water-level detection means 125 that detects the water level of secondary cooling water in the steam generator 103, the water-level-deviation calculation means 3 that calculates a deviation between a preset target water level and a water level detected by the water-level detection means 125, the valve-operation setting means 4 (the valve-aperture setting means 4a) that sets the aperture of the auxiliary feedwater valve 123 corresponding to the deviation of the water level, and the valve drive means 5 that outputs a signal for driving the auxiliary feedwater valve 123 corresponding to the setting by the valve-operation setting means 4.

According to the auxiliary feedwater valve control apparatus of a steam generator, the auxiliary feedwater valve 123 is operated without corresponding to operations of an operator and water level control of secondary cooling water in the steam generator 103 can be automatically performed.

In the auxiliary feedwater valve control apparatus of a steam generator according to the present embodiment, the valve-operation setting means 4 includes the valve-driving-time setting means 4b that sets the driving time of the auxiliary feedwater valve 123 corresponding to the aperture of the auxiliary feedwater valve 123 set by the valve-aperture setting means 4a or the inverse-response-addition setting means 4e based on an opening/closing operation speed of the auxiliary feedwater valve 123 measured in advance.

According to the auxiliary feedwater valve control apparatus of a steam generator, the driving time of the auxiliary feedwater valve 123 for realizing the set aperture of the auxiliary feedwater valve 123 is set based on the opening/closing operation speed of the auxiliary feedwater valve 123. Accordingly, the aperture of the auxiliary feedwater valve 123 can be controlled corresponding to the performance of the auxiliary feedwater valve 123.

In the auxiliary feedwater valve control apparatus of a steam generator according to the present embodiment, the number of opening/closing operations per unit time of the auxiliary feedwater valve 123 is defined. The valve-operation setting means 4 includes the valve-driving-time setting means 4b that sets the driving time of the auxiliary feedwater valve 123 corresponding to the aperture of the auxiliary feedwater valve 123 set by the valve-aperture setting means 4a or the inverse-response-addition setting means 4e based on the opening/closing operation speed of the auxiliary feedwater valve 123 measured in advance, and the valve-control-cycle setting means 4c that sets the driving cycle of the auxiliary feedwater valve 123 corresponding to the set driving time of the auxiliary feedwater valve 123 and the number of opening/closing operations per unit time of the auxiliary feedwater valve 123.

According to the auxiliary feedwater valve control apparatus of a steam generator, the driving cycle of the auxiliary feedwater valve 123 is set corresponding to the driving time of the auxiliary feedwater valve 123 set by the valve-driving-time setting means 4b and the number of opening/closing operations per unit time of the auxiliary feedwater valve 123, thereby enabling to perform appropriate water level control until the water level reaches the target water level.

In the auxiliary feedwater valve control apparatus of a steam generator according to the present embodiment, the number of opening/closing operations per unit time and the total operating time in the unit time of the auxiliary feedwater valve 123 are defined. The valve-operation setting means 4 includes the valve-driving-time setting means 4b that sets the driving time of the auxiliary feedwater valve 123 corresponding to the aperture of the auxiliary feedwater valve 123 set by the valve-aperture setting means 4a or the inverse-response-addition setting means 4e based on the opening/closing operation speed of the auxiliary feedwater valve 123 measured in advance, the valve-control-cycle setting means 4c that sets the driving cycle of the auxiliary feedwater valve 123 corresponding to the set driving time of the auxiliary feedwater valve 123 and the number of opening/closing operations per unit time of the auxiliary feedwater valve 123, and the one-cycle control-time setting means 4d that sets the longest driving time per driving cycle corresponding to the set driving cycle of the auxiliary feedwater valve 123 and the total operating time in the unit time of the auxiliary feedwater valve 123.

According to the auxiliary feedwater valve control apparatus of a steam generator, the driving cycle of the auxiliary feedwater valve 123 is set corresponding to the driving time of the auxiliary feedwater valve 123 set by the valve-driving-time setting means 4b and the number of opening/closing operations per unit time of the auxiliary feedwater valve 123, and the longest driving time per driving cycle is set corresponding to the set driving cycle of the auxiliary feedwater valve 123 and the total operating time in the unit time of the auxiliary feedwater valve 123, thereby enabling to perform appropriate water level control until the water level reaches the target water level.

In the auxiliary feedwater valve control apparatus of a steam generator according to the present embodiment, the valve-operation setting means 4 includes the inverse-response-addition setting means 4e that acquires the water-level time-response information corresponding to the aperture of the auxiliary feedwater valve 123 in advance, determines a parameter in the non-minimum phase transfer function, which approximates a response to the water level by the inverse response from the aperture of the auxiliary feedwater valve 123 set by the valve-aperture setting means 4a, based on the water-level time-response information, and sets the aperture of the auxiliary feedwater valve 123, taking into consideration a gain margin and a phase margin of frequency characteristics of the non-minimum phase transfer function in which the parameter has been determined.

According to the auxiliary feedwater valve control apparatus of a steam generator, water level variation at the time of an inverse response can be suppressed by setting the aperture of the auxiliary feedwater valve 123 according to the inverse response.

In the auxiliary feedwater valve control apparatus of a steam generator according to the present embodiment, the inverse-response-addition setting means 4e of the valve-operation setting means 4 obtains the aperture of the auxiliary feedwater valve 123, respectively, under different temperature conditions of secondary cooling water in the steam generator 103 included in the water-level time-response information, and selects a minimum value thereof.

When the temperature of secondary cooling water in the steam generator 103 is high, the temperature difference from auxiliary cooling water is large, and the maximum inverse response amount (Xp) increases, and when the feed amount of auxiliary cooling water increases, the maximum inverse response amount (Xp) further increases. Therefore, according to the auxiliary feedwater valve control apparatus of a steam generator, by setting the aperture of the auxiliary feedwater valve 123 according to the inverse response accompanied by the temperature condition to a minimum amount, water level variation at the inverse response time can be suppressed even if the temperature difference is large. Alternatively, a temperature detection means (not shown) that detects the temperature of secondary cooling water in the steam generator 103 can be provided, and the aperture of the auxiliary feedwater valve 123 can be set by matching the temperature detected by the temperature detection means with the temperature condition, thereby enabling to suppress water level variation at the time of an inverse response with any temperature.

REFERENCE SIGNS LIST 1 control means
2 storage means
3 water-level-deviation calculation means
4 valve-operation setting means
4a valve-aperture setting means
4b valve-driving-time setting means
4c valve-control-cycle setting means
4d one-cycle control-time setting means
4e inverse-response-addition setting means
5 valve drive means
103 steam generator
123 auxiliary feedwater valve
125 water-level detection means

The invention claimed is:
1. An auxiliary feed water system of a Pressurized Water Reactor comprising:
  an auxiliary feed water pipe connected to a subsequent stage of a main feed check valve in a secondary cooling water pipe;

an auxiliary feed water pump that feeds auxiliary cooling water stored in an auxiliary feed water pit to the auxiliary feed water pipe; and an auxiliary feedwater valve that adjusts a flow rate of the auxiliary cooling water passing through the auxiliary feed water pipe;

a water-level detection sensor that detects a water level of the secondary cooling water in the steam generator;

a microcomputer programmed to execute a water-level-deviation calculation program that calculates a deviation between a preset target water level and a water level detected by the water-level detection sensor;

the microcomputer programmed to execute a valve-operation setting program that sets an aperture of the auxiliary feedwater valve corresponding to a deviation of the water level; and the microcomputer programmed to execute a valve drive program that outputs a signal for driving the auxiliary feedwater valve corresponding to setting by the valve-operation setting program, wherein the valve-operation setting program acquires water-level time-response information corresponding to an aperture of the auxiliary feedwater valve in advance, determines a parameter in a non-minimum phase transfer function, which approximates a response to the water level by an inverse response from a set aperture of the auxiliary feedwater valve, based on the water-level time-response information, and sets the aperture of the auxiliary feedwater valve, taking into consideration a gain margin and a phase margin of frequency characteristics of the non-minimum phase transfer function in which the parameter has been determined.

2. The auxiliary feed water system according to claim 1, wherein the valve-operation setting program sets a driving time of the auxiliary feedwater valve corresponding to a set aperture of the auxiliary feedwater valve, based on an opening/closing operation speed of the auxiliary feedwater valve measured in advance.

3. The auxiliary feed water system according to claim 1, wherein the number of opening/closing operations per unit time of the auxiliary feedwater valve is defined, and the valve-operation setting program sets a driving time of the auxiliary feedwater valve corresponding to a set aperture of the auxiliary feedwater valve, based on an opening/closing operation speed of the auxiliary feedwater valve measured in advance, and sets a driving cycle of the auxiliary feedwater valve corresponding to the set driving time of the auxiliary feedwater valve and the number of opening/closing operations per unit time of the auxiliary feedwater valve.

4. The auxiliary feed water system according to claim 1, wherein the number of opening/closing operations per unit time and a total operating time in a unit time of the auxiliary feedwater valve are defined, and the valve-operation setting program sets a driving time of the auxiliary feedwater valve corresponding to a set aperture of the auxiliary feedwater valve, based on an opening/closing operation speed of the auxiliary feedwater valve measured in advance, and sets a driving cycle of the auxiliary feedwater valve corresponding to the set driving time of the auxiliary feedwater valve and the number of opening/closing operations per unit time of the auxiliary feedwater valve, and sets a longest driving time per driving cycle corresponding to the set driving cycle of the auxiliary feedwater valve and the total operating time in the unit time of the auxiliary feedwater valve.

5. The auxiliary feed water system according to claim 1, wherein the valve-operation setting program obtains an aperture of the auxiliary feedwater valve, respectively, under different temperature conditions of the secondary cooling water in the steam generator included in the water-level time-response information, and selects a minimum value thereof.

* * * * *